United States Patent
Khosravi et al.

(10) Patent No.: US 7,571,298 B2
(45) Date of Patent: Aug. 4, 2009

(54) SYSTEMS AND METHODS FOR HOST VIRTUAL MEMORY RECONSTITUTION

(75) Inventors: Hormuzd M. Khosravi, Portland, OR (US); David M. Durham, Hillsboro, OR (US); Travis Schluessler, Hillsboro, OR (US); Ravi Sahita, Beaverton, OR (US); Uday Savagaonkar, Hillsboro, OR (US); Priya Rajagopal, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/428,335

(22) Filed: Jun. 30, 2006

(65) Prior Publication Data

US 2007/0011430 A1     Jan. 11, 2007

Related U.S. Application Data

(63) Continuation-in-part of application No. 11/173,815, filed on Jun. 30, 2005, now abandoned.

(51) Int. Cl.
G06F 12/00 (2006.01)
G06F 9/26 (2006.01)
G06F 9/34 (2006.01)

(52) U.S. Cl. ..................................... 711/203
(58) Field of Classification Search ................... 711/203
See application file for complete search history.

(56) References Cited

U.S. PATENT DOCUMENTS

| | | | |
|---|---|---|---|
| 5,301,287 A * | 4/1994 | Herrell et al. ............... | 711/202 |
| 6,163,834 A | 12/2000 | Garcia et al. | |
| 6,321,276 B1 | 11/2001 | Forin | |
| 6,496,847 B1 | 12/2002 | Bugnion et al. | |
| 6,553,438 B1 * | 4/2003 | Coffman et al. ............... | 710/52 |
| 6,567,897 B2 | 5/2003 | Lee et al. | |
| 6,671,791 B1 * | 12/2003 | McGrath ..................... | 711/206 |
| 6,738,882 B1 | 5/2004 | Gau | |
| 6,751,720 B2 | 6/2004 | Barroso et al. | |
| 6,760,787 B2 * | 7/2004 | Forin ........................... | 710/18 |
| 2001/0014157 A1 * | 8/2001 | Hashimoto et al. .......... | 380/278 |
| 2002/0029308 A1 | 3/2002 | Babaian et al. | |
| 2002/0129212 A1 * | 9/2002 | Lee et al. .................... | 711/152 |
| 2003/0005239 A1 | 1/2003 | Dover | |

(Continued)

FOREIGN PATENT DOCUMENTS

JP     2003280989 A  * 10/2003

(Continued)

OTHER PUBLICATIONS

Webopedia; "kernel"; Mar. 12, 2002; pp. 2; http://www.webopedia.com/TERM/k/kernel.html.*

(Continued)

*Primary Examiner*—Matt Kim
*Assistant Examiner*—Christopher D Birkhimer
(74) *Attorney, Agent, or Firm*—Schwegman, Lundberg & Woessner, P.A.

(57) ABSTRACT

Systems and methods are described herein to provide for host virtual memory reconstitution. Virtual memory reconstitution is the ability to translate the host device's virtual memory addresses to the host device's physical memory addresses. The virtual memory reconstitution methods are independent of the operating system running on the host device.

30 Claims, 5 Drawing Sheets

U.S. PATENT DOCUMENTS

| | | |
|---|---|---|
| 2003/0061540 A1* | 3/2003 | Lee et al. .................... 714/31 |
| 2003/0135685 A1* | 7/2003 | Cowan ...................... 710/308 |
| 2004/0030911 A1* | 2/2004 | Isozaki et al. ............... 713/193 |
| 2004/0221200 A1* | 11/2004 | Armstrong et al. ........... 714/30 |
| 2004/0226009 A1* | 11/2004 | Mese et al. ................. 717/174 |
| 2006/0294596 A1* | 12/2006 | Govindarajan et al. ........ 726/27 |
| 2007/0005930 A1 | 1/2007 | Khosravi et al. |

OTHER PUBLICATIONS

Robert R. Collins; "Intel's System Management Mode", 1999; pp. 8; http://www.rcollins.org/ddj/Jan97/Jan97.html.*

"Windows Platform Design Notes: Standardizing Out-of-Band Management Console Output and Terminal Emulation (VT—UTF8 and VT100+"; Oct. 24, 2001; pp. 15; http://download.microsoft.com/download/1/6/1/161ba512-40e2-4cc9-843a-923143f3456c/StandardizingOutOfBandManagementConsoleOutput090.doc.*

Evangelos P. Markatos and Manolis G.H. Katevenis; "User-Level DMA without Operating System Kernel Modification"; Feb. 15, 1997; pp. 322-331; High Performance COmputer Architecture, 1999., Third International Symposium on High Performance Computer Architecture.*

Webopedia, "Bus", Dec. 1, 2002, http://web.archive.org/web/20021201122025/http://www.webopedia.com/TERM/b/bus.html.*

"U.S. Appl. No. 11/173,815 Non-Final Office Action mailed Jun. 20, 2007", 23 pgs.

"Direct Memory Access(DMA) Modes and Bus Mastering DWA", *The PC Guide*, http://www.pcguide.com/ref/hdd/if/ide/modes DWA-c.html, (Apr. 17, 2001), 3.

"DMA", *Webopedia*, HTTP://www.webopedia.com/TERM/DMA.html, (Nov. 11, 2003), 2.

Guido, D., "AMD64/ EM64T-The Coming Market", http://www2.informatik.hu-berlin.de/~drahein/article/em64t.htnl, (May 4, 2004), 5.

YU, D., "Memory Management in Jikesnode Operating System", (2005), 1,27,29.

* cited by examiner ively coupled through a communications bus. The communications bus may represent one or more busses, e.g., USB (Universal Serial Bus), FireWire, PCI, ISA (Industry Standard Architecture), X-Bus, EISA (Extended Industry Standard Architecture), or any other appropriate bus and/or bridge (also called a bus controller).

SYSTEMS AND METHODS FOR HOST VIRTUAL MEMORY RECONSTITUTION

RELATED APPLICATION

This application is a Continuation in Part of U.S. application Ser. No. 11/173,815 filed Jun. 30, 2005, now abandoned, which is incorporated herein by reference.

TECHNICAL FIELD

Various embodiments described herein relate generally to computer systems and more particularly to virtual memory reconstitution.

BACKGROUND

A conventional computing platform may include diagnostic hardware tools. An operator may employ these tools to maintain, monitor and/or troubleshoot the computing platform. Such tools are typically executed within the operating system environment of the platform. Accordingly, the usefulness of these tools is limited if the operating system environment crashes or is otherwise unavailable. Next-generation platforms may include an execution environment that is isolated from host operating system processes.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following is a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Figure 1A:
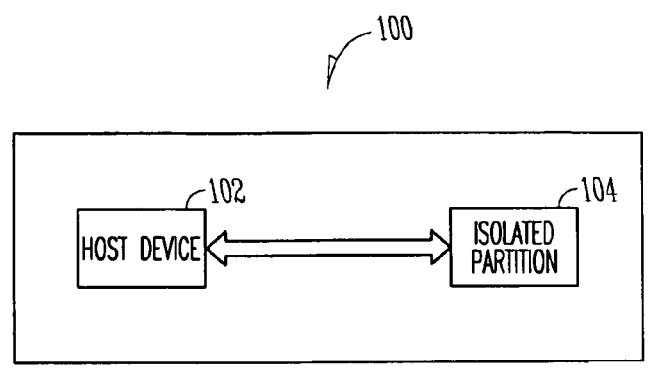
FIG. 1A is a high-level block diagram of a system according an example embodiment.

FIG. 1A is a high-level block diagram of a system according to an example embodiment. System 100 includes a host device 102 and an isolated partition 104. The isolated partition 104 is communicatively coupled to the host device 102 through any suitable means. In one embodiment, the host device 102 and the isolated partition 104 are communicatively coupled through a communications bus. The communications bus may represent one or more busses, e.g., USB (Universal Serial Bus), FireWire, PCI, ISA (Industry Standard Architecture), X-Bus, EISA (Extended Industry Standard Architecture), or any other appropriate bus and/or bridge (also called a bus controller).

The host device 102 is configured to perform operations implementing an operating system and other software applications. Operating systems may include operating systems based on Windows®, Unix, Linux, Macintosh®, and operating systems embedded on a processor. The host device 102 may include, without limitation, desktop PC, server PC, PDA, etc. The host device 102 is further configured to run one or more software applications. The software applications include, without limitation, stand alone software applications (i.e. word processing applications, login applications, and the like) and software applications that control hardware devices. Hardware devices include, without limitation, network interface cards, bus controllers, memory controllers, graphics cards, storage controllers and the like. In one embodiment, a component of the host device 102 is configured to provide host processor register information to the isolated partition 104. The host processor register information is used by the isolated partition 104 for scanning and parsing the host processor page tables.

The isolated partition 104 is configured to perform reconstitution of the host device's 102 virtual memory. Reconstitution of virtual memory is the ability to translate the host device's 102 virtual and logical memory addresses to the host device's 102 physical memory addresses. The virtual memory reconstitution methods are independent of the operating system running on the host device. In one embodiment the virtual memory reconstitution methods use the Intel Architecture (IA 32) processor memory management unit to retrieve the information needed to reconstitute the virtual memory of the host device 102.

The isolated partition 104 is an isolated execution environment that is securely separated from the host device 102. The isolated partition 104 may be, but is not limited to, a service processor, a virtual partition, an embedded microcontroller, and the like. In one embodiment, the "isolated execution environment" is an execution environment that is configured to execute code independently and securely isolated from a host that it is communicatively coupled to. In a further embodiment, the isolated execution environment is further configured to prevent software running on the host from performing operations that would alter, modify, read, or otherwise affect the code store or executable code that is running in the isolated execution environment.

In an embodiment, the host device 102 is configured to send processor register data from the host device to the isolated partition 104. In such an arrangement, the isolated partition 104 is configured to receive the processor register data and perform virtual memory reconstitution operations using that data.

Figure 1B:
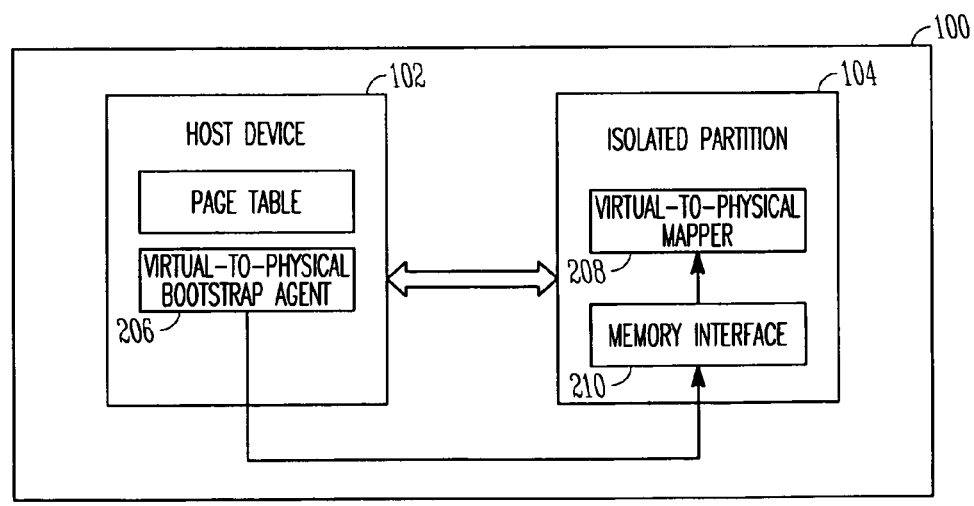
FIG. 1B is a more detailed block diagram of a system according to an example embodiment.

FIG. 1B is a more detailed block diagram of a system according to an example embodiment. The system 100 includes a host device 102 and an isolated partition 104 communicatively coupled. The host device 102 includes a Virtual to Physical Bootstrap Agent ("V2P Bootstrap Agent") 206. The isolated partition 104 includes a Virtual to Physical Mapper ("V2P Mapper") 208 and a memory interface 210.

The V2P Bootstrap Agent 206 of the host device 102 is configured to provide information about the host processor registers needed for reading the host page tables. In one embodiment, the host processor registers include the Global Descriptor Table Register (GDTR), the Local Descriptor Table Register (LDTR), and Control Register 3 (CR3). The V2P Bootstrap Agent 206 may be software or firmware. In another embodiment, the V2P Bootstrap Agent 206 may be a combination of hardware devices and software resources. V2P Bootstrap Agent 206 is discussed in greater detail below with respect to FIG. 4.

The memory interface 210 is used to pass data between the host device 102 and the isolated partition 104. In one embodiment, the memory interface 210 is a Direct Memory Access (DMA) into the host device memory. In another embodiment, the memory interface is configured to directly read memory of the host device 102 independent of the host device 102 software.

The V2P Mapper 208 of the isolated partition 104 is configured to receive a request to translate a host virtual memory address from host device 102 and to access a host page table on the host device 102 in order to translate the host virtual memory address to a host physical memory address. The V2P Mapper 208 may be software or firmware. In another embodiment, the V2P Mapper 208 may be a combination of hardware devices and software resources. V2P Mapper 208 is discussed in greater detail below with respect to FIG. 4.

Figure 2:
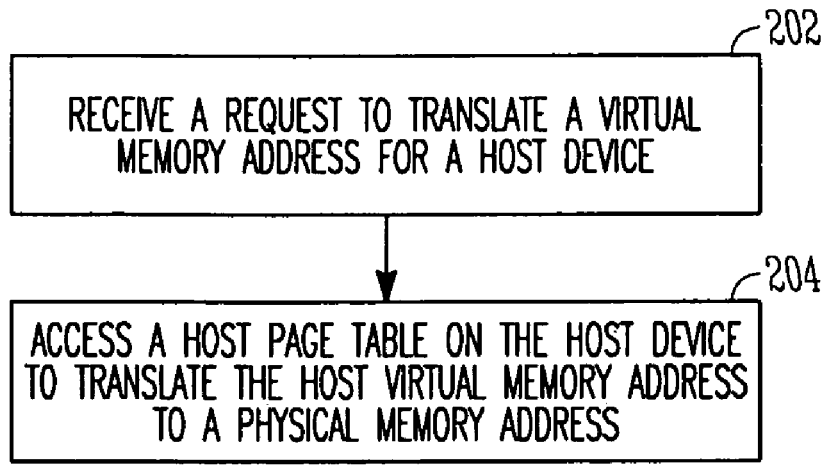
FIG. 2 is a flowchart of a method according to an example embodiment.

FIG. 2 is a flowchart of a method according to an example embodiment. In an embodiment, the operations in FIG. 2 are carried out in an isolated partition. As discussed above, the isolated partition 104 is configured to perform reconstitution of virtual memory on the host device 102. At block 202, a request to translate a host virtual memory address is received for a host device. At block 204, a host page table on the host device is accessed to translate the host virtual memory address to the host physical memory address. Methods performed by the V2P Mapper 208 are described in greater detail below with respect to FIG. 5.

In an embodiment, the operations depicted in FIG. 2 are performed on behalf of a third party device 412 (FIG. 4) on the isolated partition 104 requiring the contents of memory, the contents of memory to be used by the third party device to perform management functions. Management functions include, without limitation, management controller activities and host software agent measurement. In another embodiment, the third party device 412 includes a capability module 420. In such an arrangement the capability module 420 is configured to perform management activities. In one embodiment, the capability module 420 requests supported event types from a management core 422 on the isolated partition 104. In such an arrangement, during host device start-up or the hot-swapping of a hardware component coupled to the host device 102, the management core 422 queries one or more host device drivers on the host device 102 for event types supported by the host device driver. The management core 422 receives a response to the query and caches the event types supported by the host device drivers on the host device 102. The management core 422 receives the request for event types from the capability module 420 and determines which of the event types cached match the request. The capability modules 420 registered to the event type can then subscribe to that event type and perform management activities using event data related to that event type. In the context of the present discussion, the capability module 420 uses the contents of a virtual memory address to perform one or more of those management activities. The management core 422, using the V2P mapper 402, receives the request from the capability module 420, translates the virtual memory address in the request to a physical memory address and then retrieves the contents of the physical memory address and returns that to the capability module 420.

Figure 3:
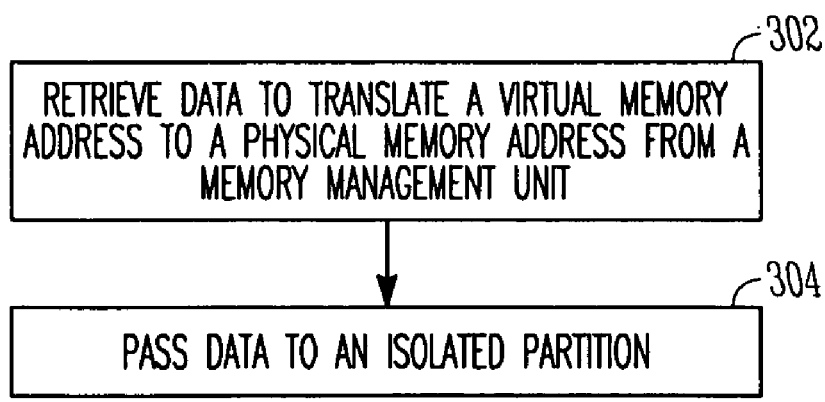
FIG. 3 is a flowchart of a method according to an alternate embodiment.

FIG. 3 is a flowchart of a method according to an alternate embodiment. In an embodiment, the operations depicted in FIG. 3 show operations carried out on a host device 102. As discussed above, the host device is configured to provide host processor register information to the isolated partition 104. At block 302, data to translate a virtual memory address to a physical memory address is retrieved. At block 304, the data is passed to an isolated partition.

Figure 4:
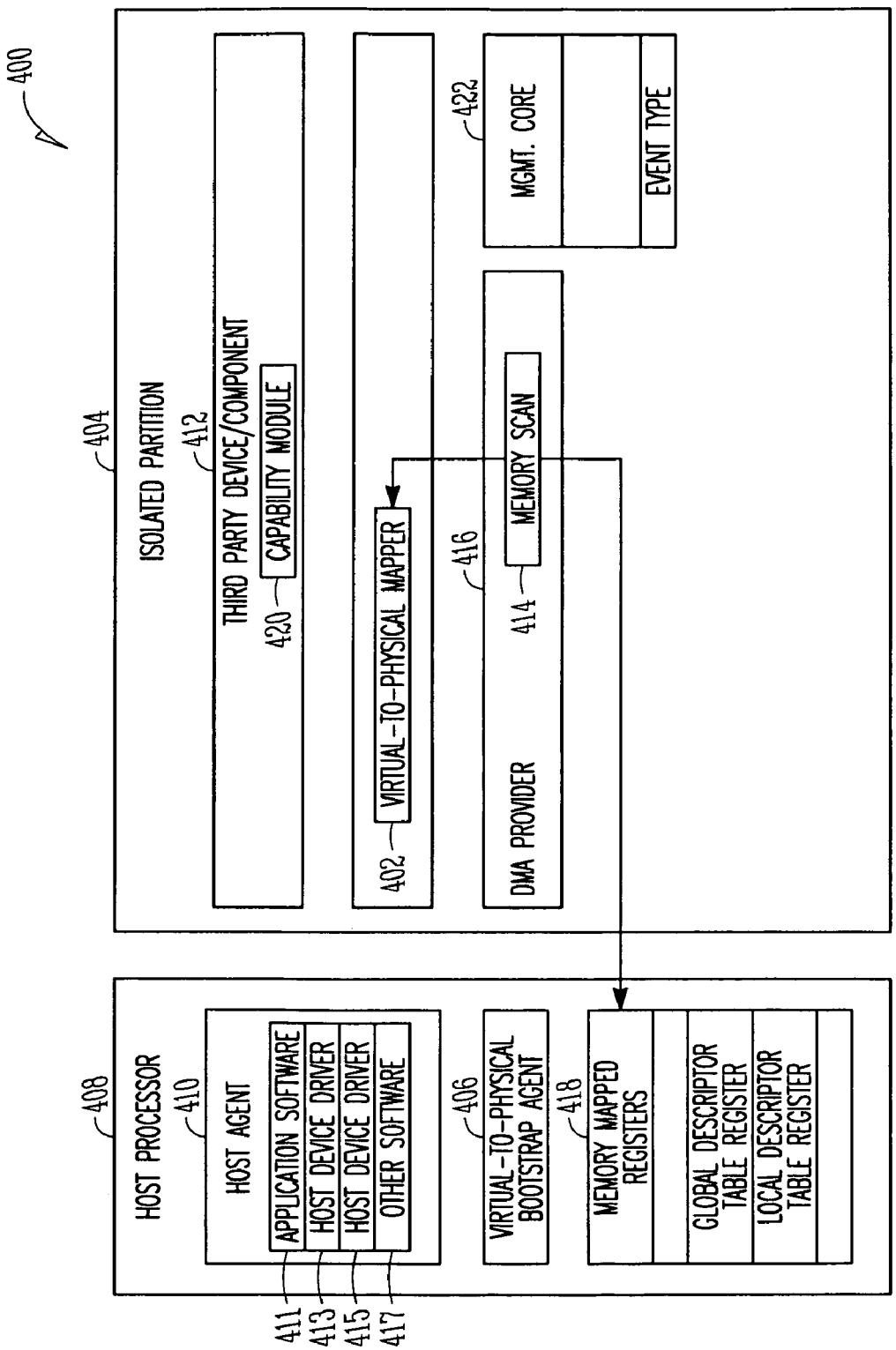
FIG. 4 is a more detailed block diagram of a system according an example embodiment.

FIG. 4 is a more detailed block diagram of a system according to an example embodiment. FIG. 4 illustrates one example of components of a virtual memory reconstitution system 400. System 400 comprises a V2P Mapper 402 running on an isolated partition 404, and a V2P Bootstrap agent 406 running on a host 408. In one example, V2P Mapper 402 resides on the isolated partition 404 and maps host virtual and logical addresses to physical addresses. V2P Bootstrap agent 406 runs in the System Management Mode of the host processor, in one example, and in another example, V2P Bootstrap agent 406 runs as a host kernel (ring-0) component.

When a component 412 of the isolated partition 404 would like to access memory space allocated to a host agent 410, V2P Mapper 402 first translates the virtual address of host agent 410 in order to locate the memory space of host agent 410 in physical memory. In one example, host agent 410 comprises software that includes device drivers 413 and 415, application software 411, and other software 417.

In one embodiment, the component 412 includes a capability module 420 on the isolated partition 404, the capability module 420 to receive and process event management data and to perform management activities based on that data.

In order to successfully map addresses, V2P Bootstrap agent 406 provides V2P Mapper 402 with information from the host processor memory mapped registers 418 that V2P Mapper 402 needs to read the host page tables. In one example, the host processor is an Intel Architecture (IA-32) based processor, and the host processor registers 418 include the Global Descriptor Table Register (GDTR), Local Descriptor Table Register (LDTR), and Control Register 3 (CR3). A DMA Provider 416 includes a Memory Scan capability 414. Once V2P Mapper 402 has received the page table data, V2P Mapper 402 maps the virtual or logical address into a physical address.

Figure 5:
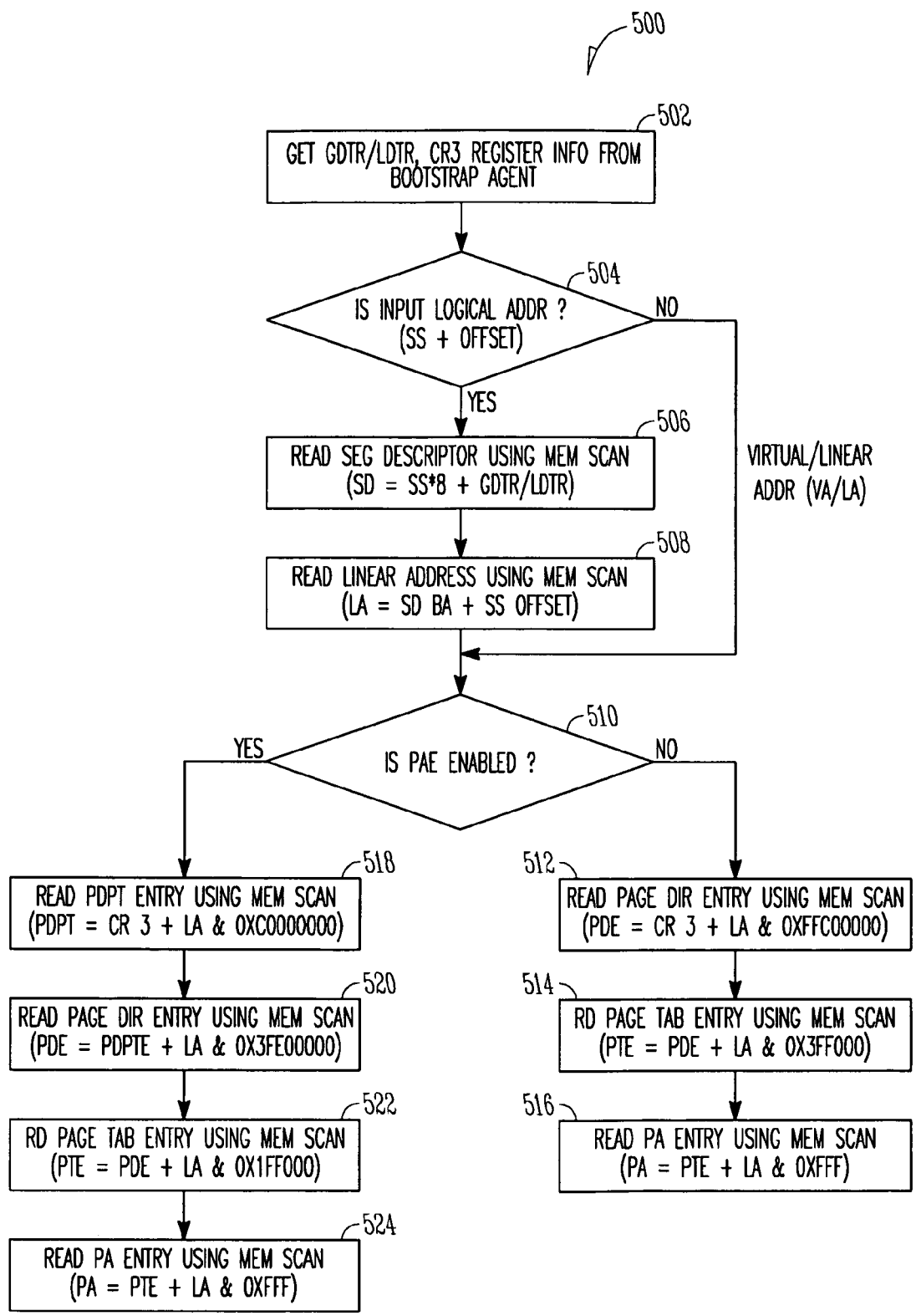
FIG. 5 is a more detailed flowchart of a method according to an example embodiment.

FIG. 5 is a more detailed flowchart of a method according to an example embodiment. In an example embodiment, the operations depicted in FIG. 5 are carried out on an isolated partition 104 as discussed above with respect to FIGS. 1, 2, and 4.

In one embodiment, the method 500 in FIG. 5 begins by a V2P Mapper 402 acquiring host processor register information from a Host Bootstrap agent 406 at block 502. The register information is needed to access host processor page tables. In one embodiment, the register information includes the Global Descriptor Table Register (GDTR), the Local Descriptor Table Register (LDTR), and Control Register 3 (CR3).

In one embodiment, the method 500 continues at block 504 by V2P Mapper 402 receiving an input address to be reconstituted and determining if the address is a logical address. In one embodiment, V2P Mapper 402 determines if the address is logical by checking to see if the input address has a 16 bit Segment Selector (SS) and a 32 bit Offset. If V2P Mapper 402 determines that the input address is not a logical address, then the address is a linear/virtual address and V2P Mapper 402 can skip to linear address translation as block 510. If V2P Mapper 402 determines that the input address is a logical address, V2P Mapper 402 then translates the logical address to a linear address.

In one embodiment applicable to Intel processor architectures, translation of the logical address to a linear address begins at block 506 by V2P Mapper 402 reading the Segment Descriptor. In one embodiment, the V2P Mapper 402 calculates the Segment Descriptor (SD) address by multiplying the 13 bit index from the Segment Selector of the logical addresses by eight (8) and adding in the GDTR or LDTR base address. A Table Indicator (TI) bit within the Segment Selector indicates whether the GDTR or LDTR base address should be used. Once the Segment Descriptor address has been calculated, V2P Mapper 402 uses an associated memory scan capability 414 to read the Segment Descriptor and obtain the Segment Descriptor Base Address (SD BA).

In one embodiment, translation of the logical address continues at block 508 with the V2P Mapper 402 calculating the linear/virtual address. V2P Mapper 402 adds the SD BA to the logical address offset (SS Offset). The result of this addition is the linear address.

At block 510, according to an example embodiment, V2P Mapper 402 determines if Physical Address Extension (PAE) is enabled. V2P Mapper 402 can determine if PAE is enabled by checking the PAE flag of Control Register 4 (CR4) on the host processor. In one example, the entry of CR4 is obtained from Host Bootstrap Agent 406.

Referring to block 512 of the method 500 when PAE is not enabled, V2P Mapper 402 then reads the Page Directory entry (PDE) of the linear address according to an example embodiment. V2P Mapper 402 calculates the address of the Page Directory entry by adding the entry of CR3 to bits 22-31 of the linear address. Bits 22-31 of the linear address are obtained by multiplying the linear address by ffc00000 (LA x ffc00000). Using an associated memory scan capability 414, V2P Mapper 402 reads the calculated PDE address to obtain the PDE in the example embodiment.

In one embodiment, the method 500 continues at block 514 when PAE is not enabled by V2P Mapper 402 reading the PTE of the linear address. V2P Mapper 402 calculates the address of the PTE by adding the PDE to bits 12-21 of the linear address. Bits 12-21 of the linear address are obtained by multiplying the linear address by 0x3ff000 (LA 0x3ff000). Using an associated memory scan capability 414, V2P Mapper 402 reads the calculated PTE address and obtains the PTE.

Concluding one alternative to the method 500 at block 516 when PAE is not enabled V2P Mapper 402 reads the Page Address (PA) of the linear address. V2P Mapper 402 calculates the Page Address by adding the PTE to bits 0-11 of the linear address. Bits 0-11 of the linear address are obtained by multiplying the linear address by 0xfff (LA 0xfff). Using an associated memory scan capability 414, V2P Mapper 402 reads the calculated Page Address and obtains the Page information.

Referring back to block 518 of the method 500, when PAE is enabled, V2P Mapper 402 reads the Page Directory Pointer Table (PDPT) entry of the linear address. V2P Mapper 402 calculates the address of PDPT entry by adding the entry of CR3 to Bits 30 and 31 of the linear address. Bits 30 and 31 of the Linear address are obtained by multiplying the linear address by 0xc0000000 (LA 0xc0000000). Using an associated memory scan capability 414, V2P Mapper 402 reads the calculated PDPT address to obtain the PDPT entry.

In one embodiment, the method 500 continues at block 520 when PAE is enabled by V2P Mapper 402 reading the Page Directory entry (PDE) of the linear address. V2P Mapper 402 calculates the address of the Page Directory entry by adding the PDPT entry to bits 20-29, of the linear address. Bits 20-29 of the linear address are obtained by multiplying the linear address by 0x3fe00000 (LA 0x3fe00000). Using an associated memory scan capability 414, V2P Mapper 402 reads the calculated PDE address to obtain the PDE.

In one embodiment, at block 522 the method 500 continues when PAE is enabled by V2P Mapper 402 reading the PTE of the linear address. V2P Mapper 402 calculates the address of the PTE by adding the PDE to bits 11-19 of the linear address. Bits 11-19 of the linear address are obtained by multiplying the linear address by 0x1ff000 (LA 0x1ff000). Using an associated memory scan capability 414, V2P Mapper 402 reads the calculated PTE address and obtains the PTE. Concluding another alternative to the method 500, at block 524, when PAE is enabled, V2P Mapper 402 reads the Physical Address (PA) of the linear address. V2P Mapper 402 calculates the PA by adding the PTE to bits 0-11 of the linear address. Bits 0-11 of the linear address are obtained by multiplying the linear address by fff (LA x fff). The PA is the final physical address of the Page. Using an associated memory scan capability 414, V2P Mapper 402 reads the final physical address and obtains the data of the Page. Embodiments of the invention are not limited to the example described by reference to FIG. 5.

Figure 6:
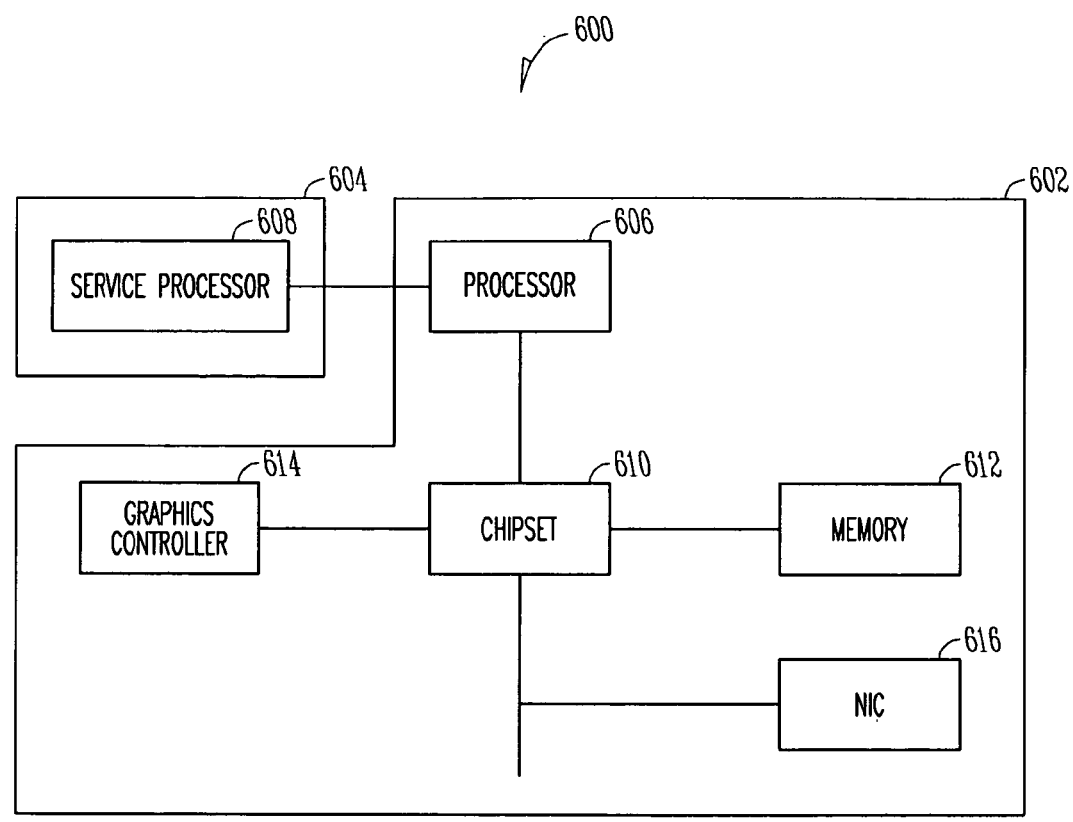
FIG. 6 is a block diagram of a system according to another embodiment.

FIG. 6 is a block diagram of a system according to another embodiment. System 600 includes an isolated partition 604 and host device 602. Isolated partition 604 includes a service processor 608, which may execute functions attributed to virtual memory reconstitution. Host device 602 comprises processor 606. Host device 602 also includes chipset 610 and memory 612. Memory 612 may comprise any suitable type of memory, including but not limited to Single Data Rate Random Access Memory and Double Data Rate Random Access Memory. Other functional units of host device 602 include graphics controller 614 and Network Interface Controller (NIC) 616, each of which may communicate with processor 606 via chipset 610.

Software running on the isolated partition 604 may access host physical memory 612 associated with host resident software (both kernel level and application level). An isolated partition 604 will typically have the ability to access host physical memory 612. However, the host device 602 typically maps the entire host physical memory 612 to a virtual address space and, thus, the host resident software operates on virtual addresses. Without the virtual memory reconstitution process described above, when the host resident software operates on virtual addresses, the isolated partition 604 could not access host physical memory 612.

In one embodiment, the virtual memory reconstitution process may be used to enable a variety of security and manageability applications without requiring any changes to host software or any special operating system support. Since the translation of the host device's virtual memory to the host device's physical memory is done on the isolated partition 604, the virtual memory reconstitution process is tamper resistant and not subject to tamper the way the host resident page table data structures are. In addition, the physical address translation process is operating system agnostic and can work across any operating system environment.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the terms "comprising" and "wherein," respectively. Moreover, the terms "first," "second," and "third," etc. are used merely as labels, and are not intended to impose numerical requirements on their objects.

What is claimed is:

1. A method performed on apparatus comprising a host device and an isolated partition communicatively coupled to the host device by a communications bus,
   wherein the host device includes a plurality of memory mapped processor registers, at least one host device driver, a memory, and a page table, and
   wherein the isolated partition includes a capability module, a management core, and a virtual to physical mapper, the method comprising:
   receiving, by the management core from the capability module, a request for event types supported by at least one host device driver;
   querying, by the management core from the at least one host device driver, event types supported by the at least one host device driver;
   caching, by the management core, the supported event types on the host device;
   requesting, by the capability module from the management core, one or more of the cached event types;
   determining, by the management core, which of the cached event types match the request for one or more cached event types;
   sending, by the capability module to the virtual to physical mapper, a virtual memory address corresponding to a matching cached event type;
   acquiring, by the virtual to physical mapper from the memory mapped processor registers, register information including information in a global descriptor table register, a local descriptor table register, and a control register;
   using, by the virtual to physical mapper, the register information to access the page table;
   translating, by the virtual to physical mapper, the virtual memory address to a physical memory address, using the page table; and
   retrieving, by the virtual to physical mapper, event data related to the matching cached event type at the physical memory address of the host device memory.

2. The method of claim 1 further comprising performing, by the capability module, at least one management function using the event data, without requiring any changes to host device software.

3. The method of claim 1 wherein retrieving event data is performed using a direct memory access (DMA) memory scan, and independent of an operating system running on the host device.

4. The method of claim 1, further comprising accessing additional noncontiguous host physical memory addresses corresponding to an area of virtual memory.

5. The method of claim 1 further comprising:
   receiving, by the isolated partition, a host logical memory address from the host device; and
   referencing, from the isolated partition, a host descriptor table on the host device to translate the host logical memory address to a second virtual memory address.

6. The method of claim 1, wherein the physical memory address is associated with kernel level software for the host device.

7. The method of claim 1, wherein the physical memory address is associated with application level software for the host device.

8. A machine-accessible medium having machine-executable instructions contained therein, which when executed by a machine perform operations on a host device and an isolated partition communicatively coupled to the host device by a communications bus, wherein the host device includes a plurality of memory mapped processor registers, at least one host device driver, a memory, and a page table, and wherein the isolated partition includes a capability module, a management core, and a virtual to physical mapper, the operations comprising:
   receiving, by the management core from the capability module, a request for event types supported by at least one host device driver;
   querying, by the management core from the at least one host device driver, event types supported by the at least one host device driver;
   caching, by the management core, the supported event types on the host device;
   requesting, by the capability module from the management core, one or more of the cached event types;
   determining, by the management core, which of the cached event types match the request for one or more cached event types;
   sending, by the capability module to the virtual to physical mapper, a virtual memory address corresponding to a matching cached event type;
   acquiring, by the virtual to physical mapper from the memory mapped processor registers, register information including information in a global descriptor table register, a local descriptor table register, and a control register;
   using, by the virtual to physical mapper, the register information to access the page table;
   translating, by the virtual to physical mapper, the virtual memory address to a physical memory address, using the page table; and
   retrieving, by the virtual to physical mapper, event data related to the matching cached event type at the physical memory address of the host device memory.

9. The medium of claim 8 wherein retrieving event data from the physical memory address is tamper-resistant.

10. The medium of claim 9 wherein retrieving event data is performed using a direct memory access (DMA) memory scan, and independent of an operating system running on the host device.

11. The medium of claim 8, wherein the operations further comprise accessing additional noncontiguous host physical memory addresses corresponding to an area of virtual memory.

12. The medium of claim 8 wherein the operations further comprise:
receiving, by the isolated partition on the host device, a host logical memory address from the host device; and
referencing, from the isolated partition on the host device, a host descriptor table on the host device to translate the host logical memory address to a second host virtual memory address.

13. The medium of claim 8, wherein the physical memory address is associated with kernel level software or application level software for the host device.

14. The medium of claim 8, wherein the host device provides information about its address translation to the isolated partition in a secure, un-spoofable manner using a special processor mode such as the system management mode (SMM).

15. An apparatus comprising:
a bus;
a memory to store executable program code, the memory coupled to the bus;
a host processor coupled to the bus, wherein the host processor includes a plurality of memory mapped processor registers, at least one host device driver, and a page table; and
a service processor coupled to the bus, wherein the service processor includes a capability module, a management core, and a virtual to physical mapper, the service processor operable to perform operations comprising
receiving, by the management core from the capability module, a request for event types supported by at least one host device driver;
querying, by the management core from the at least one host device driver, event types supported by the at least one host device driver;
caching, by the management core, the supported event types on the host processor;
requesting, by the capability module from the management core, one or more of the cached event types;
determining, by the management core, which of the cached event types match the request for one or more cached event types;
sending, by the capability module to the virtual to physical mapper, a virtual memory address corresponding to a matching cached event type;
acquiring, by the virtual to physical mapper from the memory mapped processor registers, register information including information in a global descriptor table register, a local descriptor table register, and a control register;
using, by the virtual to physical mapper, the register information to access the page table;
translating, by the virtual to physical mapper, the virtual memory address to a physical memory address, using the page table; and
retrieving, by the virtual to physical mapper, event data related to the matching cached event type at the physical memory address of the memory; and
wherein the service processor is a service processor of an isolated partition.

16. The apparatus of claim 15 wherein retrieving event data from the physical memory address is tamper-resistant.

17. The apparatus of claim 16 wherein retrieving event data is performed using a direct memory access memory scan, and independent of an operating system running on the host processor.

18. The apparatus of claim 15, further operable to perform operations comprising accessing additional noncontiguous host physical memory addresses corresponding to an area of virtual memory.

19. The apparatus of claim 15 further operable to perform operations comprising:
receiving, by the service processor, a host logical memory address from the host processor; and
referencing, from the service processor, a host descriptor table on the host processor to translate the host logical memory address to a second host virtual memory address.

20. The apparatus of claim 15, wherein the physical memory address is associated with kernel level software or application level software for the host processor.

21. The apparatus of claim 15, wherein the host processor provides information about its address translation to the service processor in a secure, un-spoofable manner using a special processor mode such as the system management mode (SMM).

22. The apparatus of claim 15, wherein the service processor is tamper-resistant.

23. A system comprising:
a memory to store executable program code;
a host processor coupled to the memory, wherein the host processor includes a plurality of memory mapped processor registers, at least one host device driver, and a page table;
a service processor of an isolated partition, wherein the isolated partition includes a capability module, a management core, and a virtual to physical mapper, and wherein the service processor is to perform operations comprising
receiving, by the management core from the capability module, a request for event types supported by at least one host device driver;
querying, by the management core from the at least one host device driver, event types supported by the at least one host device driver;
caching, by the management core, the supported event types on the host processor;
requesting, by the capability module from the management core, one or more of the cached event types;
determining, by the management core, which of the cached event types match the request for one or more cached event types;
sending, by the capability module to the virtual to physical mapper, a virtual memory address corresponding to a matching cached event type;
acquiring, by the virtual to physical mapper from the memory mapped processor registers, register information including information in a global descriptor table register, a local descriptor table register, and a control register;
using, by the virtual to physical mapper, the register information to access the page table;
translating, by the virtual to physical mapper, the virtual memory address to a physical memory address, using the page table; and retrieving, by the virtual to physical mapper, event data related to the matching cached event type at the physical memory address of the memory; and a bus to communicatively couple the host processor to the service processor.

24. The system of claim 23 wherein the system is further to perform:

retrieving data from the physical memory address.

25. The system of claim 24 wherein retrieving data is performed using a direct memory access memory scan, and independent of an operating system running on the host processor.

26. The system of claim 23, wherein the system is further to perform:

accessing additional noncontiguous host physical memory addresses corresponding to an area of virtual memory.

27. The system of claim 23 wherein the system is further to perform:

receiving, by the service processor, a host logical memory address from the host processor; and referencing, from the service processor, a host descriptor table on the host processor to translate the host logical memory address to a second host virtual memory address.

28. The system of claim 23, wherein the physical memory address is associated with kernel level software or application level software for the host processor.

29. The system of claim 23, wherein the host processor provides information about its address translation to the service processor in a secure, un-spoofable manner using a special processor mode such as the system management mode (SMM).

30. The system of claim 23, wherein the service processor is tamper-resistant.

* * * * *